(12) United States Patent
Jaakkola et al.

(10) Patent No.: US 7,289,807 B2
(45) Date of Patent: Oct. 30, 2007

(54) SYSTEM AND METHOD FOR USING LICENSED RADIO TECHNOLOGY TO DETERMINE THE OPERATION PARAMETERS OF AN UNLICENSED RADIO TECHNOLOGY IN A MOBILE TERMINAL

(75) Inventors: Mikko Jaakkola, Lempaala (FI); Pekko Orava, Tampere (FI); Tuomas Maattanen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/159,700

(22) Filed: Jun. 23, 2005

(65) Prior Publication Data

US 2006/0009219 A1 Jan. 12, 2006

Related U.S. Application Data

(60) Provisional application No. 60/582,663, filed on Jun. 24, 2004.

(51) Int. Cl.
*H04Q 7/20* (2006.01)
*H04Q 7/32* (2006.01)

(52) U.S. Cl. .............. 455/435.2; 455/435.1; 455/432.1; 455/422.1; 455/558; 455/551; 455/550.1; 370/310; 370/328; 370/338

(58) Field of Classification Search ........... 455/435.1, 455/435.2, 432.1, 432.2, 556.1, 435.3, 422.1, 455/403, 450, 451, 452.1, 452.2, 412.1, 412.2, 455/414.1, 414.3, 414.2, 434, 9, 500, 517, 455/509, 512, 513, 550.1, 516, 522, 552.1, 455/553.1, 557, 556.2, 551, 558; 370/310, 370/328, 338
See application file for complete search history.

(56) References Cited

U.S. PATENT DOCUMENTS

| 119,548 | A | 10/1871 | Webster |
| 6,256,731 | B1 | 7/2001 | Hall et al. |
| 6,556,825 | B1 * | 4/2003 | Mansfield ............... 455/426.1 |
| 6,597,671 | B1 | 7/2003 | Ahmadi et al. |
| 2002/0082022 | A1 * | 6/2002 | Johnson ..................... 455/450 |
| 2003/0115261 | A1 | 6/2003 | Mohammed |
| 2004/0005892 | A1 | 1/2004 | Mayer et al. |
| 2004/0109431 | A1 * | 6/2004 | Abrahamson et al. ...... 370/342 |
| 2004/0214539 | A1 * | 10/2004 | Rajamani et al. ......... 455/161.1 |
| 2005/0143115 | A1 * | 6/2005 | Hiddink et al. ............. 455/522 |
| 2005/0181805 | A1 | 8/2005 | Gallagher |
| 2006/0019660 | A1 * | 1/2006 | Li .............................. 455/434 |

FOREIGN PATENT DOCUMENTS

| EP | 1 494 490 | 6/2003 |
| WO | WO 2005/057698 | 6/2005 |

* cited by examiner

*Primary Examiner*—Keith Ferguson
(74) *Attorney, Agent, or Firm*—Foley and Lardner LLP

(57) ABSTRACT

A system and method for using licensed radio technology for determining the operation parameters which should be used by a terminal. The present invention involves the terminal using its GSM system, if activated, to determine whether mobile country code for a nearby cellular terminal is located within the United States or Canada. If the code designates the United States or Canada, then the terminal uses the US domain and the corresponding transmission channels and power levels. If the code does not designate the United State or Canada, then an ETSI domain is used, along with the appropriate transmission channels and power levels.

33 Claims, 4 Drawing Sheets

SYSTEM AND METHOD FOR USING LICENSED RADIO TECHNOLOGY TO DETERMINE THE OPERATION PARAMETERS OF AN UNLICENSED RADIO TECHNOLOGY IN A MOBILE TERMINAL

CROSS-REFERENCE TO RELATED PATENT APPLICATIONS

The present application claims priority to U.S. Provisional Patent Application No. 60/582,663, filed Jun. 24, 2004 and incorporated herein by reference.

FIELD OF THE INVENTION

The present invention relates generally to the field of wireless communication systems. More particularly, the present invention relates to the determination of parameters of wireless access devices in wireless communication systems.

BACKGROUND OF THE INVENTION

In wireless communication systems, it can be difficult to obtain the operating location information from a wireless local area network (WLAN) in a reliable manner for the purpose of adjusting various WLAN parameters. As used herein "operating location information" refers to information concerning the geographical region where a wireless device or terminal is located at a given moment.

Current Federal Communications Commission (FCC) regulations state that WLAN systems can only operate among channels 1-11 within the United States. In accordance with FCC regulations, the end user cannot modify the regulatory domain as defined in the IEEE 802.11m standard. The regulatory domain defines parameters, such as the list of channels, maximum power level, etc., that relate to the operation of the WLAN device. Therefore, this regulation makes it difficult to allow the use of tri-band Global System for Mobile Communications (GSM)-WLAN devices, as either FCC approvals would not be obtainable for the device, or the WLAN service providers would need to limit the number of channels available in Europe.

Previously, vendors have implemented two different types of WLAN multimode devices, with one type designed for the European Union (EU) and the other type designed for the United States (US). Under this arrangement, however, devices brought from the United States to Europe would not be able to operate within WLAN 2.4 GHz channels 12-13. There is therefore a need for using licensed radio technology to determine the operating parameters of an unlicensed radio technology in a mobile terminal.

SUMMARY OF THE INVENTION

Various embodiments presented herein make it possible for multimode terminals to use a mobile station's location information, such as country-code or cell information, based upon information from one or more systems, such as cellular or GPS systems, for the purpose of adjusting the operation and/or operating parameters, such as WLAN parameters, in another system, such as a WLAN system. It is likely that the use of location information based upon information from one or more systems, such as a cellular system, may be more reliable than the information from another system such as an unlicensed WLAN system.

Cellular-WLAN dual-mode terminals which include both US and EU cellular bands cannot be certified in accordance with FCC requirements if they have full European Telecommunications Standards Institute (ETSI) WLAN channel support. Therefore, current cellular-WLAN terminals are developed for operation either the U.S. or EU are of two types-terminals that support U.S. cellular bands and U.S. WLAN regulatory domain parameters, and terminals that support EU cellular bands and EU WLAN regulatory domain parameters. Furthermore, limiting WLAN channel support only to the US is not an optimal solution because ETSI WLAN networks widely use all available channels. These issues are addressed by the embodiments described herein. The embodiments described herein are applicable to all regulatory domains supported by the IEEE 802.11 standard.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described in connection with the embodiments illustrated in the following drawings.

DETAILED DESCRIPTION OF THE PREFERRED EMBODIMENTS

The following is a description of an exemplary embodiment of the present invention. Reference is made to the accompanying drawing which form a part hereof, and in which is shown by way of illustration of an embodiment in which the invention may be practiced. It is to be understood that other embodiments may be utilized, as structural and operational changes may be made without departing from the scope of the present invention.

Figure 1:
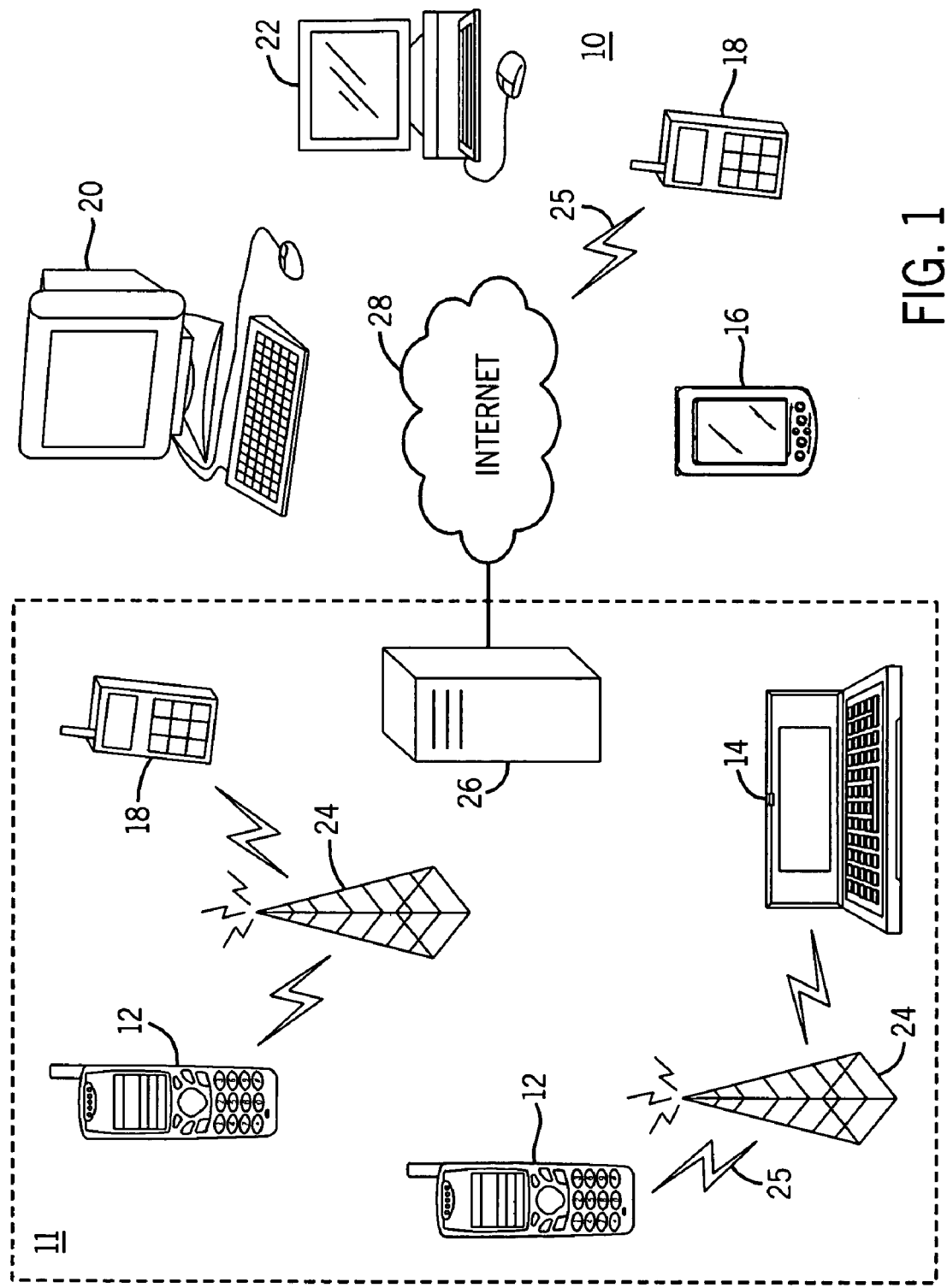
FIG. 1 is an overview diagram of a system according to an embodiment of the present invention.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
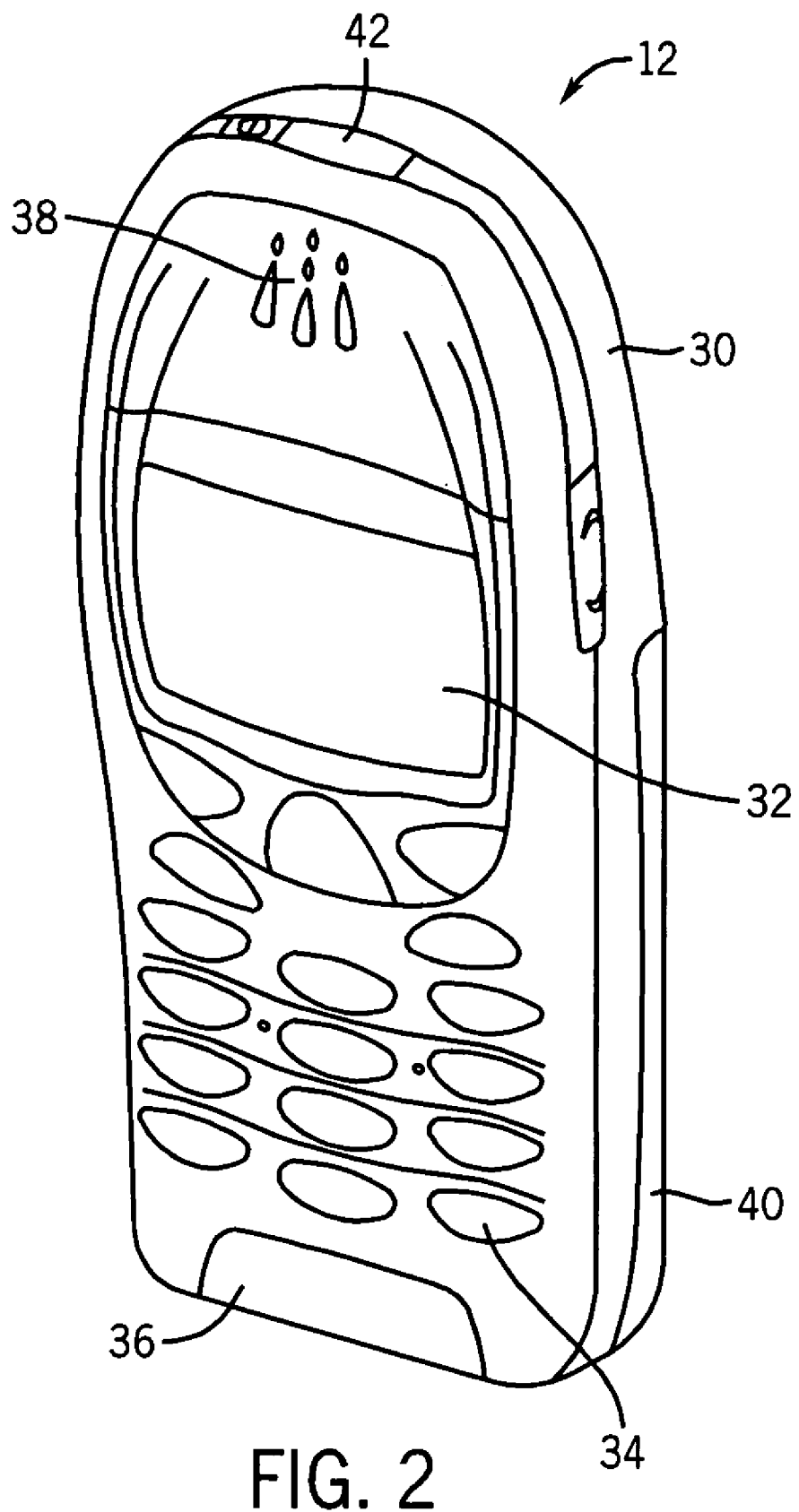
FIG. 2 is a perspective view of a mobile telephone that can be used in the implementation of the present invention.
Figure 3:
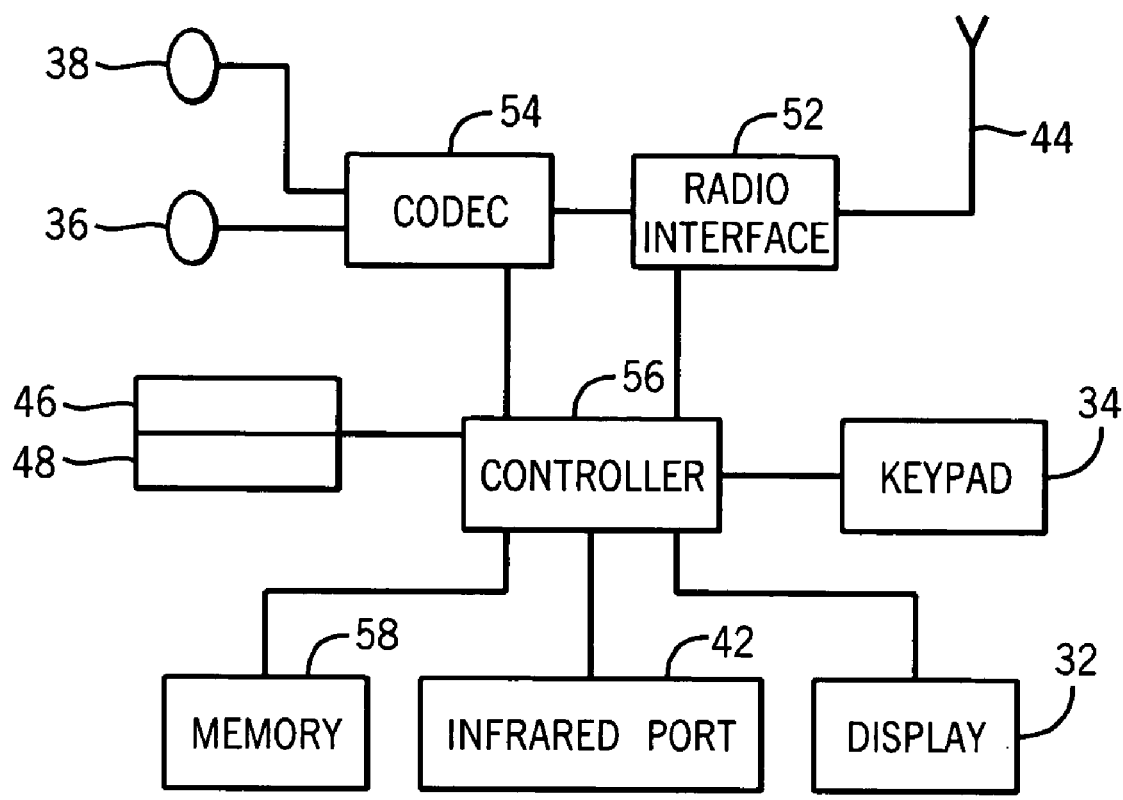
FIG. 3 is a schematic representation of the telephone circuitry of the mobile telephone of FIG. 2.

FIGS. 2 and 3 show one representative mobile telephone 12 according to one embodiment of the invention. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The embodiments presented herein enable multimode WLAN terminals to use location information, such as country-code or cell information, based upon information from one or more systems, such as cellular or GPS systems, for the purpose of adjusting the operation and/or operating parameters, such as WLAN parameters, in another system, such as a WLAN system. The use of location information based on information from one or more systems, such as the cellular system, may be more reliable than the information from another system, such as the unlicensed WLAN system.

Cellular-WLAN dual-mode terminals which include both US and EU cellular bands cannot be certified in accordance with FCC requirements if they have full European Telecommunications Standards Institute (ETSI) WLAN channel support. Therefore, cellular-WLAN terminals have been of two types-terminals that support U.S. cellular bands and U.S. WLAN channels, and terminals that support EU cellular bands and EU WLAN channels. Furthermore, limiting WLAN channel support only to the US is not an optimal solution because ETSI WLAN networks widely use all available channels. These issues are addressed by the embodiments described herein. The embodiments described herein are applicable to all regulatory domains supported by the IEEE 802.11 standard.

In one embodiment of the present invention, a WLAN multimode terminal initiates a WLAN connection by first querying the mobile country code or similar information from a cellular base station or cellular system. This information is used to determine the current geographical region within which the WLAN terminal is located. This information can then be used to set up the correct channel range, as well as to transmit proper power-levels.

In another embodiment of the present invention, the location information can be cached for a certain length of time, such as for up to five hours, for situations where the mobile telephone is switched off. The length of time is modifiable based upon the amount of time it takes for one to travel from one location to another. For example, five hours may be a preferable time period because one currently cannot travel to the United States from Europe in a shorter period of time than five hours.

If the device is within the United States or Canada, then in one embodiment of present invention, the device would use only channels 1-11. In another embodiment, if the mobile device is within the United States or Canada, then a transmission power level up to 1000 mW may be allowable. If the device, on the other hand, is determined to be within the EU, then an embodiment would permit the terminal to use channels 1-13. yet another embodiment would allow transmission power levels up to 100 mW if the device was determined to be within the EU.

The present invention can also take into account special cases in Europe. In one embodiment, if the device is determined to be operating in France, the power-level could be set to 10 mW in order to ensure that no one breaks the transmission level requirements when moving outdoors. In this type of embodiment, a system implementing the particular embodiment can check to determine whether the terminal is located within any of a plurality of regions, and choosing a default region if it is determined that the terminal is not in any of the plurality of regions.

Another method of implementing the present invention is to use operator-provided cell information. It is possible to obtain the current operator ID from the network if the wireless operator provides mapping to WLAN parameters for each cell. For example, an operator in France could easily determine that cell Xxx.Yxx is an indoor cell, then the WLAN terminal can use the maximum allowable transmission power level. If, on the other hand, cell Ggg.Uuu is an outdoor cell, then the WLAN terminal should only use 10 mW of transmission power.

In yet another embodiment of the present invention, the default operating parameters for the device are chosen such that they comprise the most restrictive parameters from the list of parameters that correspond to the regulatory domains that the device supports. For example, the default operating parameters may comprise channels 1-11 and a maximum power level of 10 mW. In this example, channels 1-11 is the most restrictive list of channels when one compares the list of WLAN channels supported by both the U.S. and the EU Similarly, when one compares the maximum power levels allowable by the U.S and E.U regions, the 10 mW power level limitation in France is more restrictive than the power levels in the U.S or any other region of the EU.

WLAN standards support regulatory domain update features, as described in IEEE 802.11d, where access points can be programmed to periodically broadcast current regulatory domains and maximum allowed power levels. However, IEEE 802.11d data cannot solely be used to determine the domain, as the operator of the WLAN network can set the regulatory domain erroneously. Furthermore, a number of existing access points do not currently support 802.11d, meaning that they do not broadcast the current operating regulatory domain information. In the embodiments described herein, however, the IEEE 802.11d data can be used in addition to cellular based domain detection, with priority given to the cellular detection. In other words, cellular domain data overrides IEEE 802.11d data.

Figure 4:
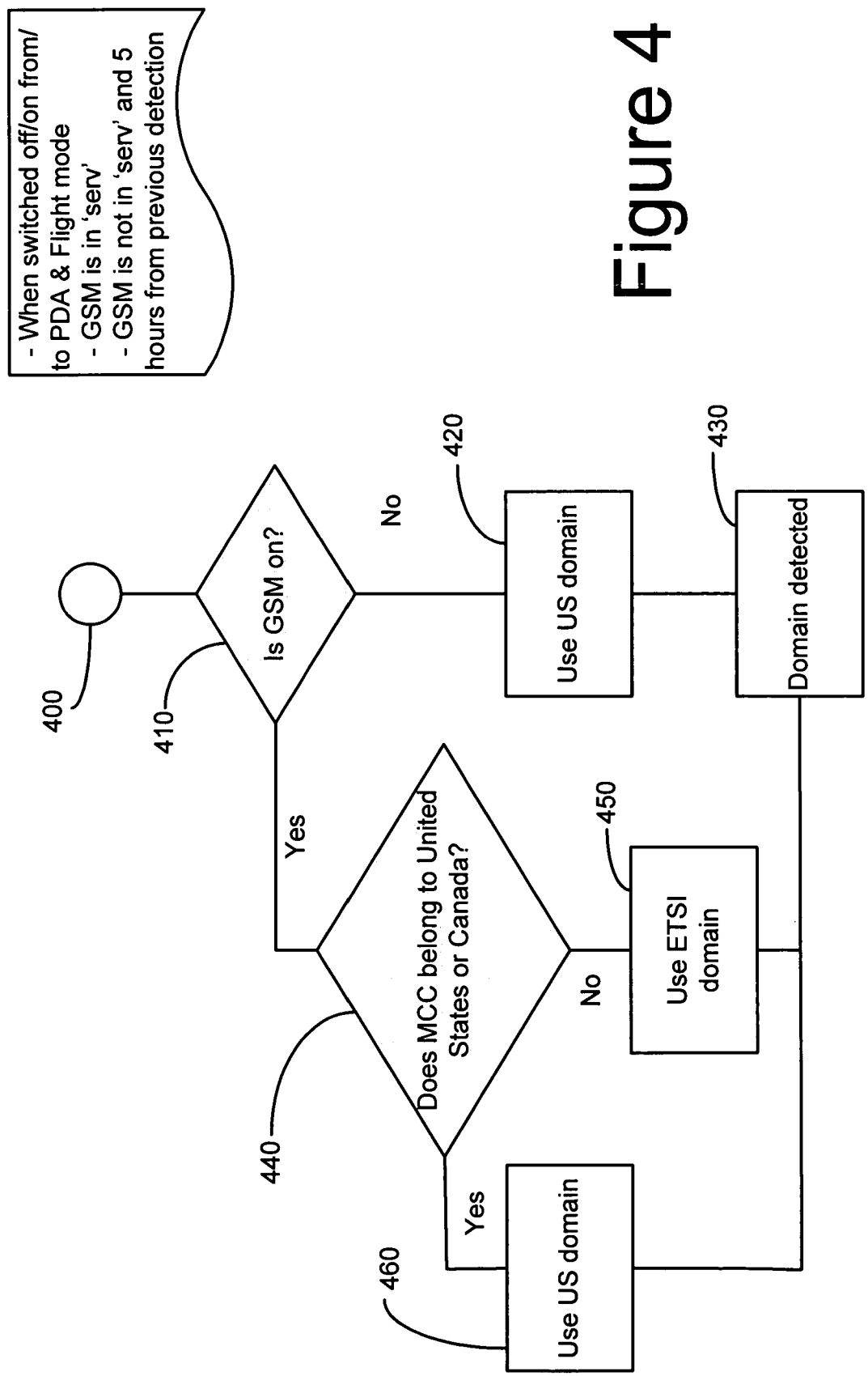
FIG. 4 is a flowchart which is illustrative of an algorithm in accordance with an embodiment of the present invention.

FIG. 4 is a flow chart showing the implementation of one embodiment of the present invention. At step 400 in FIG. 4, the algorithm of the present invention is initiated. This can occur in a variety of situations, such as when the terminal is switched on, when the terminal leaves a "flight" mode, or when the GSM is not in a service mode but it has been at least five hours since a previous detection. At step 410, it is determined whether the GSM is activated. If the GSM is not activated, then the US domain is used at step 420, and the domain is later detected at step 430. If the GSM is activated, then it is determined at step 440 whether the mobile country code (MCC) emanating from a nearby cellular terminal is located within United States or Canada. If the MCC is for the United States or Canada, then at step 450, the US domain is used and is detected at step 430. If the MCC is not for the United States or Canada, on the other hand, then the ETSI domain is used at step 460, and this domain is detected at step 430. It should also be noted, however, that these steps can be altered so that the European Union is the default region at step 420, and the system can also be modified to address other regions that currently exist or may exist in the future.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques, with rule based logic, and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for setting operating parameters for a terminal configurable for operation in a plurality of regions, comprising:
   determining whether a mobile country code from a system designates one of at least one specified region;
   if the mobile country code designates one of the at least one specified region, setting operating parameters for the mobile terminal to those parameters required by the designated region; and
   if the mobile country code does not designate one of the at least one specified region, setting the operating parameters for the terminal to a set of default operating parameters, wherein the set of default operating parameters comprise the most restrictive parameters from a list of parameters corresponding to all regulatory domains that the terminal supports.

2. The method of claim 1, further comprising:
   before determining whether a mobile country code from the system designates one of the at least one specified region, determining whether a system is activated in an area within which the terminal is located; and
   if the system is not activated in the area, setting the operating parameters for the terminal to the set of default operating parameters.

3. The method of claim 1, wherein the system comprises a GSM system.

4. The method of claim 1, wherein the system comprises a UMTS system.

5. The method of claim 1, wherein the system comprises a CDMA system.

6. The method of claim 1, wherein the system comprises a WLAN system.

7. The method of claim 1, wherein the at least one specified region comprises the United States and Canada.

8. The method of claim 7, wherein the set of default operating parameters comprise the operating parameters for the European Union.

9. The method of claim 1, wherein the operating parameters for the at least one specified region comprise:
   permitting the terminal to communicate using only channels 1-11; and
   permitting the terminal to use a transmission power level of up to 1000 mW.

10. The method of claim 1, wherein the set of default operating parameters comprise:
    permitting the terminal to communicate using channels 1-13; and
    permitting the terminal to use a transmission power level of up to 100 mW.

11. The method of claim 1, wherein the set of default operating parameters comprise:
    permitting the terminal to communicate using channels 1-13; and
    permitting the terminal to use a transmission power level of up to 10 mW.

12. A computer program product for a terminal configurable for operation in a plurality of regions, comprising:
    computer code for determining whether a mobile country code from a system designates one of at least one specified region;
    computer code for, if the mobile country code designates one of the at least one specified region, setting operating parameters for the terminal to those parameters required by the designated region; and
    computer code for, if the mobile country code does not designate one of the at least one specified region, setting the operating parameters for the terminal to a set of default operating parameters, wherein the set of default operating parameters comprise the most restrictive parameters from a list of parameters corresponding to all regulatory domains that the terminal supports.

13. The computer program product of claim 12, wherein the system comprises a GSM system.

14. The computer program product of claim 12, further comprising:
   computer code for, before determining whether a mobile country code from the system designates one of the at least one specified region, determining whether a system is activated in an area within which the terminal is located; and
   computer code for, if the system is not activated in the area, setting the operating parameters for the terminal to the set of default operating parameters.

15. The computer program product of claim 12, wherein the system comprises a UMTS system.

16. The computer program product of claim 12, wherein the system comprises a CDMA system.

17. The computer program product of claim 12, wherein the system comprises a WLAN system.

18. The computer program product of claim 12, wherein the at least one specified region comprises the United States and Canada.

19. The computer program product of claim 18, wherein the set of default operating parameters comprise the operating parameters for the European Union.

20. The computer program product of claim 12, wherein the operating parameters for the at least one specified region comprise:
   permitting the terminal to communicate using only channels 1-11; and
   permitting the terminal to use a transmission power level of up to 1000 mW.

21. The computer program product of claim 12, wherein the set of default operating parameters comprise:
   permitting the terminal to communicate using channels 1-13; and
   permitting the terminal to use a transmission power level of up to 100 mW.

22. The computer program product of claim 12, wherein the set of default operating parameters comprise:
   permitting the terminal to communicate using channels 1-13; and
   permitting the terminal to use a transmission power level of up to 10 mW.

23. An electronic device, comprising:
   a processor; and
   a memory unit operatively connected to the processor and including:
      computer code for determining whether a mobile country code from a system designates one of at least one specified region;
      computer code for, if the mobile country code designates one of the at least one specified region, setting operating parameters for the terminal to those parameters required by the designated region; and
      computer code for, if the mobile country code does not designate one of the at least one specified region, setting the operating parameters for the terminal to a set of default operating parameters, wherein the set of default operating parameters comprise the most restrictive parameters from a list of parameters corresponding to all regulatory domains that the terminal supports.

24. The electronic device of claim 23, wherein the system comprises a GSM system.

25. The electronic device of claim 23, wherein the memory unit further comprises:
   computer code for, before determining whether a mobile country code from the system designates one of the at least one specified region, determining whether a system is activated in an area within which the terminal is located; and
   computer code for, if the system is not activated in the area, setting the operating parameters for the terminal to the set of default operating parameters.

26. The electronic device of claim 23, wherein the at least one specified region comprises the United States and Canada.

27. The electronic device of claim 26, wherein the set of default operating parameters comprise the operating parameters for the European Union.

28. The electronic device of claim 23, wherein the operating parameters for the at least one specified region comprise:
   permitting the terminal to communicate using only channels 1-11; and
   permitting the terminal to use a transmission power level of up to 1000 mW.

29. The electronic device of claim 23, wherein the set of default operating parameters comprise:
   permitting the terminal to communicate using channels 1-13; and
   permitting the terminal to use a transmission power level of up to 100 mW.

30. The electronic device of claim 23, wherein the system comprises a UMTS system.

31. The electronic device of claim 23, wherein the system comprises a CDMA system.

32. The electronic device of claim 23, wherein the system comprises a WLAN system.

33. The electronic device of claim 23, wherein the memory unit further comprises computer code for caching the setting for the operating parameters for a designated period of time.

* * * * *